US008636367B1

(12) United States Patent
Callison et al.

(10) Patent No.: US 8,636,367 B1
(45) Date of Patent: Jan. 28, 2014

(54) SYSTEM AND METHOD FOR CONTROLLING MULTIPLE BEAMS ILLUMINATING PROJECTED IMAGES

(75) Inventors: John P. Callison, Kansas City, MO (US); Jeffrey S. Pease, Kansas City, MO (US); Gordon L. Elliott, Overland Park, KS (US)

(73) Assignee: Magic Lantern, LLC, Overland Park, KS (US)

( * ) Notice: Subject to any disclaimer, the term of this patent is extended or adjusted under 35 U.S.C. 154(b) by 273 days.

(21) Appl. No.: 13/317,415

(22) Filed: Oct. 17, 2011

Related U.S. Application Data (60) Provisional application No. 61/455,207, filed on Oct. 15, 2010.

(51) Int. Cl.
| | |
|---|---|
| G03B 21/00 | (2006.01) |
| G03B 21/26 | (2006.01) |
| G03B 21/28 | (2006.01) |
| G02B 7/182 | (2006.01) |
| G02B 26/08 | (2006.01) |
| G02B 26/10 | (2006.01) |
| G02B 26/12 | (2006.01) |

(52) U.S. Cl.
USPC ............ 353/98; 353/31; 353/94; 353/122; 359/199.1; 359/223.1; 359/871; 359/877

(58) Field of Classification Search
USPC .............. 353/31, 37, 94, 98–99, 30, 122; 359/196.1, 199.1–199.4, 202.1, 223.1, 359/224.1–224.2, 871–872, 877
See application file for complete search history.

(56) References Cited

U.S. PATENT DOCUMENTS

| | | | | |
|---|---|---|---|---|
| 6,636,274 | B1* | 10/2003 | Mazda et al. | 348/745 |
| 6,670,603 | B2* | 12/2003 | Shimada et al. | 250/235 |
| 6,844,951 | B2* | 1/2005 | Cannon et al. | 359/199.3 |
| 6,860,606 | B2* | 3/2005 | Childers et al. | 353/31 |
| 7,436,564 | B2* | 10/2008 | Gomi et al. | 359/213.1 |
| 7,972,014 | B2* | 7/2011 | Hung et al. | 353/69 |
| 8,011,789 | B2* | 9/2011 | Murata | 353/69 |
| 8,282,222 | B2* | 10/2012 | Smits | 353/85 |
| 8,430,512 | B2* | 4/2013 | Smits | 353/85 |
| 2003/0021497 | A1* | 1/2003 | Kandori et al. | 382/323 |
| 2006/0209264 | A1* | 9/2006 | Yamazaki et al. | 353/31 |
| 2006/0244925 | A1* | 11/2006 | Seki et al. | 353/52 |
| 2007/0222953 | A1* | 9/2007 | Bock et al. | 353/98 |
| 2009/0251620 | A1* | 10/2009 | Mortensen | 348/744 |

* cited by examiner

*Primary Examiner* — Tony Ko
*Assistant Examiner* — Jori S Reilly-Diakun
(74) *Attorney, Agent, or Firm* — Montgomery W. Smith (57) ABSTRACT

The power and response curves of one or more beams or primaries of beams of a laser projection system illuminating an image on a viewing surface are controlled to desired characteristics during exhibition by monitoring the scanning beams in real time by using at least part of the horizontal blanking time during the scanning of a motion or still image to project a test pattern with one or more of the beams onto a sensor or sensors. The system and method permits real-time balancing and maintenance of the response curves and power levels of each of the beams, and of primary beams of combined beams, to desired targets so as to produce a display field without artifacts and at desired brightness on the viewing surface.

20 Claims, 5 Drawing Sheets

FIG. 5 ns project. Laser projector is schematically represented

SYSTEM AND METHOD FOR CONTROLLING MULTIPLE BEAMS ILLUMINATING PROJECTED IMAGES

PRIORITY DATA & INCORPORATION BY REFERENCE

This application claims the benefit of priority to U.S. Provisional Patent Application No. 61/455,207, filed Oct. 15, 2010, entitled "System and Method for Controlling Multiple Beams Illuminating Projected Images" and which is incorporated by reference in its entirety.

TECHNICAL FIELD

The present invention relates generally to image projection methods and systems, and more specifically laser projection methods and systems.

SUMMARY OF INVENTION

The present invention provides for a method and system for controlling the power and response curves (transfer functions) of one or more beams of a laser projection system illuminating an image on a viewing surface. A deviation of power or response curve between beams simultaneously writing multiple lines, or variations in power or response curve in the primaries of a combined beam writing a single line, can cause undesirable visible patterns or artifacts on the screen.

Preferred embodiments of our invention resolve these and other problems by monitoring the scanning beams during the projection of images on the viewing surface by using at least part of the horizontal blanking time during the raster scanning of a motion or still image to project a test pattern with one or more of the beams onto a sensor or sensors. In more preferred embodiments, the sensor(s) is positioned to intercept the beam just beyond a point corresponding to the edge of the image frame on the screen (referenced hereinafter for convenience as "edge sensors"). By testing each beam or primary component of a combined beam individually during one or more scan passes during the writing of a frame, the lasers, modulators and other components of the laser projection system may be controlled, as required or desired, to emit individual beams or components of beams at desired or normalized levels. The test pattern is preferably not projected onto the viewing surface. The sensors or a masking structure block the beams from reaching the screen during the horizontal blanking time during which the test pattern is projected. Our invention permits real-time balancing and maintenance of the response curves and power levels of each of the beams, and of primary beams of combined beams, to desired targets so as to produce a display field without artifacts and at desired brightness on the viewing surface.

In some preferred embodiments the sensors are positioned to measure the beams downstream of the last optical elements in the projector system so as to sense and account for or minimize the differential effects of the optical elements upon the different beams and to correct for real world phenomena such as dust. In one such preferred embodiment, the sensor or sensors are located in position to intercept the beams when projected toward a point just to the outside of an edge of the image frame displayed on the screen.

It may be preferable to calibrate the edge sensor or sensors relative to the power of the beams directed to locations within the image frame. In a preferred embodiment we employ a centrally-placed calibration sensor at about the same distance from the scanner as the edge sensor(s). The calibration sensor is also preferably positioned at or in about the same vertical position as the edge sensor(s). In our preferred embodiment, the calibration sensor is preferably movable out of the path of the beams during exhibition. Substantially simultaneous measurements can be taken at the calibration and edge sensors to calibrate the power sensed by the edge sensors to the desired power level projected in the center of the image. Measurements are preferably taken at different data inputs and the output power datapoints recorded at each level. This is repeated for each beam or each primary beam of each combined beam, if applicable.

As noted above, during exhibition the output power of each beam or the primary of each combined beam is preferably monitored on a near-continuous basis by inserting a test pattern into the image feed to the modulators/modulation subsystem with a relative timing to display the test pattern on the edge sensor(s) during the horizontal blanking period before the beginning and/or after the writing of the image lines for a given scan pass. In such embodiments using edge sensors, the number of measurements per frame is generally limited only by the number of scan passes that cross the sensor, so more samples may be generated by incorporating taller or additional sensors positioned to sense additional scan passes. The power levels of the test patterns are varied so as to monitor variations in overall (maximum) power and, in some preferred embodiments, to sense changes in any of the individual response curves. Appropriate adjustments are made as required by optimization software, adjusting either the power output of one or more lasers or modulators or by adjusting the response curve of one or more laser/modulator systems. The control points may vary, depending, in particular, on whether or not there is a one-for-one correspondence between the number of beams/primaries and the number of lasers.

BRIEF DESCRIPTION OF THE DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1:
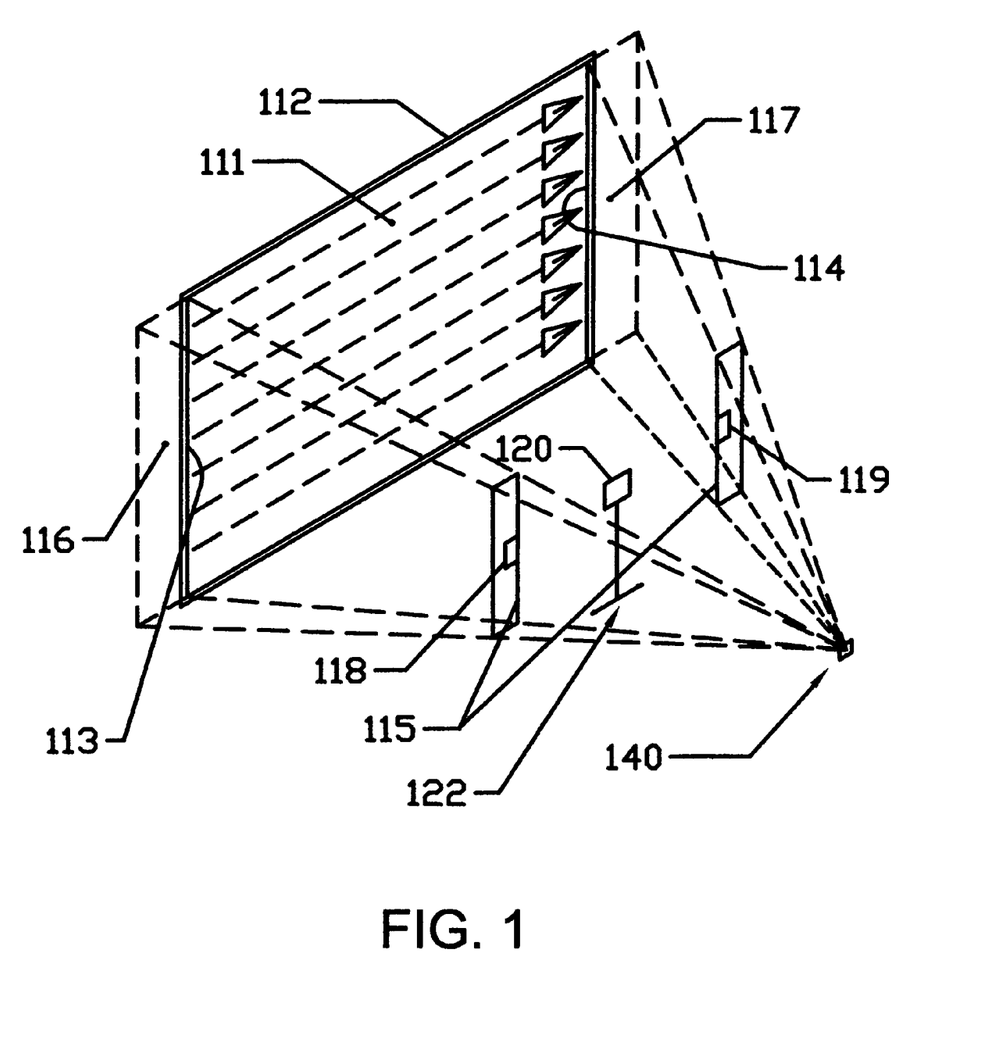
FIG. 1 is a schematic diagram showing the arrangement of components of a preferred embodiment of our invention.

A preferred embodiment of our invention shown in FIG. 1 is applied to a laser projection system similar to that disclosed in commonly owned U.S. Pat. Nos. 7,102,700 and 7,142,257, each of which is incorporated by reference as though fully set forth herein. The laser projector is schematically represented as scanner 140 in FIG. 1. Although our preferred embodiments invention is illustrated using the multiple-line scanning system disclosed in U.S. Pat. Nos. 7,102,700 and 7,142,257, it should be noted that our invention is applicable to laser projection systems in general. The scanner 140 preferably includes beam source(s) comprised of lasers and modulators for primary colors and in some embodiments beam combiners, scanning components to traverse laser beams from the beam source(s) along a screen, and a controller to control the timing and power level of the beams emitted from the beam source(s) according to pixel and other data to illuminate successive frames on a substantial area of screen 112 defining an image frame 111, as shown in FIG. 1. In a preferred embodiment the scanner 140 is configured such that the image frame 111 occupies substantially the entirety of the screen 112. For this embodiment, the scanner 140 traverses combined beams along image lines from side edge 113 to side edge 114 of the image frame 111 on the screen 112 during each of a series of scan passes while traversing the beams vertically to illuminate different sets of image lines from top to bottom edges of the image frame 111 during each scan pass of a given frame.

Figure 4:
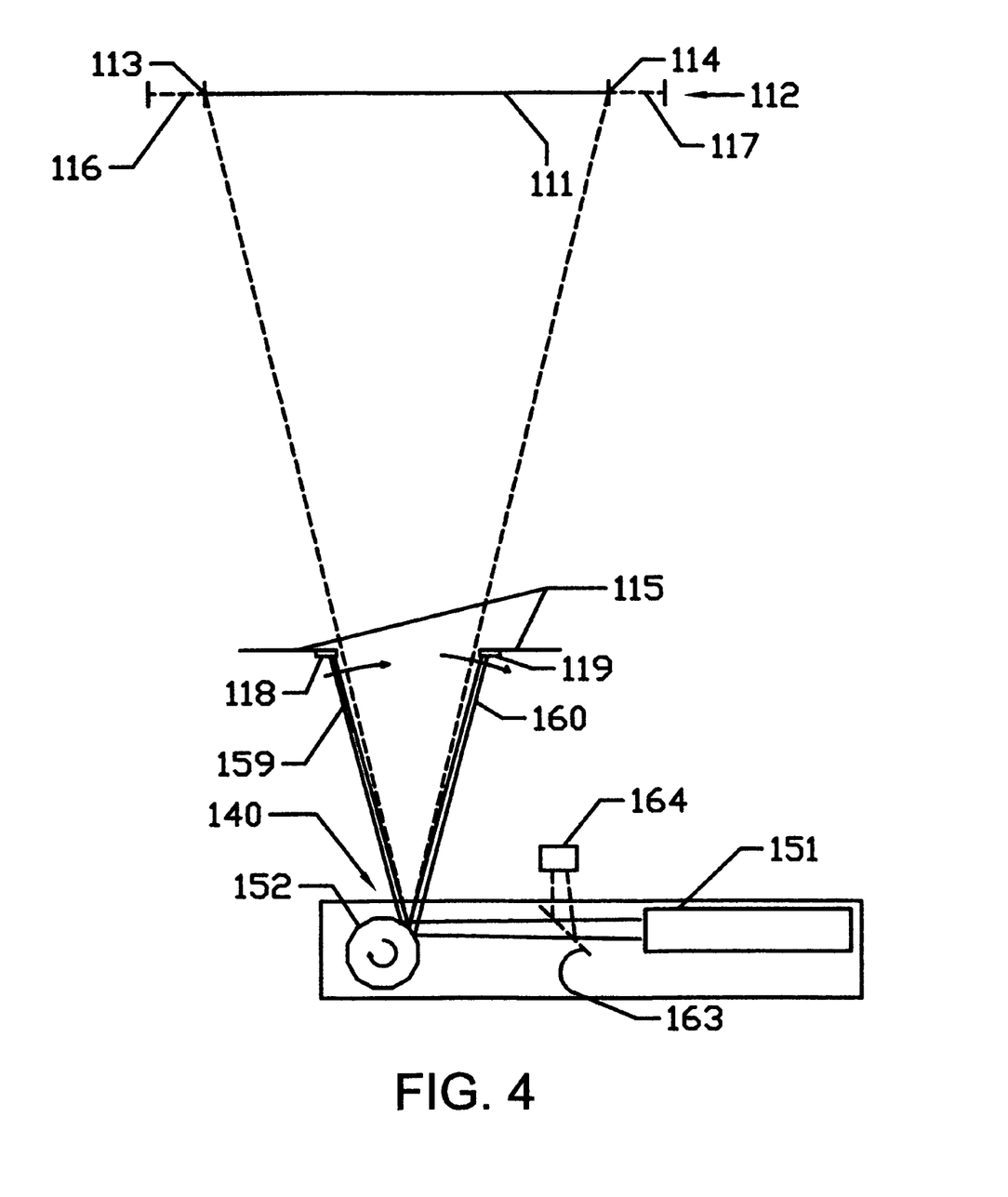
FIG. 4 is a schematic diagram showing the arrangement of components of a preferred embodiment of our invention.

The scanner 140 and its controller are preferably adapted to sweep the beams slightly beyond the image area side edges 113 and 114 into overscan areas 116 and 117 as seen FIGS. 1 and 4. The overscan areas 116, 117 include the portion of each scan pass wherein the spot would be illuminated beyond the side edges 113, 114 if not blanked by the controller during the horizontal blanking time of each scan pass. Note that in our preferred embodiment, most of the overscan areas 116, 117 would be beyond the end of the screen 112. Masks 115 are preferably positioned between the scanner section 140 and the screen to block the ghosting produced by the facet edges of the polygon used in our preferred embodiment as the horizontal scanning element from being directed toward the screen 112, or portions of the exhibition space adjacent the screen 112, as further described herein. The distance between the scanner 140 and the masks 115 is greatly exaggerated in FIGS. 1, 2 and 4 for illustrative purposes.

Edge sensors 118 and 119 are preferably positioned between the scanner 140 and the screen 112 to be illuminated by the beams at a point where the beams would otherwise illuminate the overscan areas 116 and 117 during one or more horizontal scan passes of a given frame. The edge sensors 118, 119 are preferably incorporated as an extension of the masks 115. In another preferred embodiment, only one sensor 119 is employed at the end of one or more scan passes.

The controller of the scanner 140 preferably inputs a test pattern to be projected by the scanner 140 when the respective beams illuminate the edge sensors 118, 119 during period 174 (FIG. 5) to provide a known modulation drive level for comparison of the sensed beam characteristic against a target or calculated desired beam characteristic. For example, in a preferred embodiment using combined (red, green and blue) beams, during the horizontal blanking period for one or more given scan passes, the controller turns on the green primary beam of one such combined beam to a desired level while blanking the remaining primary beams of such combined beam and other combined beams to compare the sensed green beam power level against the target power level. During this given frame and other frames, the process would be repeated for the green primaries of the remaining combined beams. In this embodiment the red and blue primaries of each combined beam would then be tested in similar fashion. Each of the primaries would be adjusted in a timely manner to their desired levels. Our invention also allows, however, for the control system to respond to out-of-bound measurements with such adjustments so as to meet pre-programmed priorities, such as maximizing output while maintaining white balance. Note that the primaries of a combined beam may themselves be the product of polarization-combining two or more beams from two or more laser sources of the same color, for example, green; in such a instance a preferred embodiment of our invention would first test the totality of the green for a given combined beam and then individually test and measure the output of each of the green lasers sources. Although in the foregoing example green primaries were initially sensed, other primaries could be initially sensed, different primaries could be sensed, or all primaries could be sensed in any order, including randomly, to allow adjustment of the beams to desired levels and characteristics. Additionally other test patterns may be used to sense the response curves or transfer functions of the primaries and combined beams by varying the power level inputs during several scan passes, so as to adjust power levels or other characteristics of the respective beam primaries accordingly.

The lateral position of the edge sensors 118, 119 is preferably just outside the position of the beam corresponding to the illumination of the respective side edge 113 or 114 of the image frame on the screen, but not so close that the beam writing at the edge of the image frame would be partially masked by the sensor(s). The longitudinal position of the sensors is preferably sufficiently proximate the scanner 140 to permit the sensors to be mounted on or be part of the projector housing to allow the laser projector to have as small a physical volume as possible, yet sufficiently distant as to readily resolve the spot illuminating the test pattern on the edge sensor 118, 119 and allow sufficient lateral spacing between the edge 113, 114 of the image area 111 and the edge sensor 118, 119 or mask 115 to prevent blocking the beams while writing the image pixels most proximate to the edge 113, 114 of the image area 111. Care must be taken in systems such as our preferred embodiment to accommodate the width of the beams in areas proximate to the scanner.

Many preferred embodiments use a rotating polygon 152 as the horizontal scanning element. The polygon scans in one direction and each scan on the screen corresponds to, a facet on the rotating polygon. In such a system a raster scan of an entire frame can be achieved with no horizontal fly-back (blanking time). However, it is well-known to anyone skilled in the art that it is often desirable to add some horizontal blanking to avoid vignetting effects on the facet edge or for other reasons. This can be conveniently done within our system by assigning within the control electronics a number of potential pixels to each facet in excess of the number of required active image pixels. In a preferred embodiment using a 24-facet polygon we assign 4608 pixels to each facet when projecting a 4096×2160 image. Thus the image space (in the scan direction, generally horizontally) corresponds to only approximately 89 percent of the scan angle of each facet, minimizing vignetting and allowing sufficient space for one or more edge sensors (118, 119) and the required time to generate and sense the test signals used by our invention.

Figure 5:
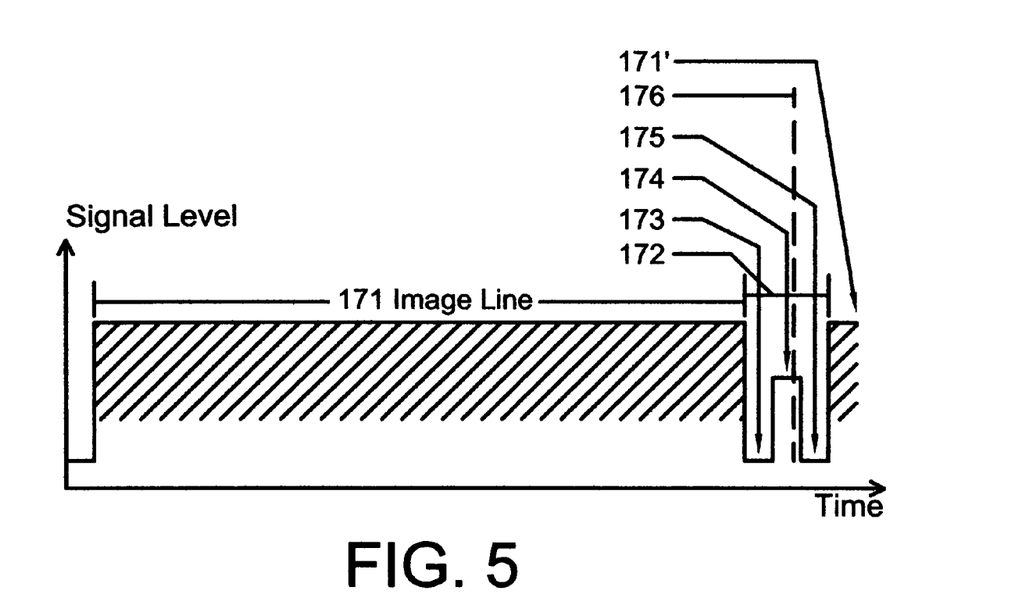
FIG. 5 is a graphical representation of signal level versus time for a scan pass of a preferred embodiment of our invention.

FIG. 5 shows the timing of the signal for one line with a test pattern generated in the horizontal blanking time, in one preferred embodiment of this invention. The visible portion of the image line 171 in FIG. 5 would be projected to screen 112 in FIGS. 1, 2 and 4, between side edges 113 and 114. Light emitted by the laser during horizontal blanking period 172 would reach the screen 112 or another surface outside the screen unless an edge sensor 119 or blocking means such as mask 115 is advantageously employed. FIG. 5 also shows the visible portion of the next image line 171' following the horizontal blanking period 172. The horizontal blanking period 172 can be broken into three subperiods, initial blanking 173, test pattern 174, and subsequent blanking 175. Test patterns could be sampled at time 176, shown in FIG. 5. It is preferable to prevent beams from illuminating the screen 112 during subperiods 173, 174, and 175, and as shown in FIG. 5 this is preferably accomplished by turning off the beams during the blanking subperiods 173 and 175, and blocking the beams with the masks 115 (including the sensor(s) 118, 119) during at least the test pattern subperiod 174. The blanking subperiods 173 and 175 are preferably of sufficient width to insure that the test pattern does not illuminate the image area near the side edges 113, 114 of the image frame. The distance from the scanning system to the sensors 118, 119 and any masks 115 must be small enough to permit a reasonable commercial package of the projection system, yet large enough to allow resolution of the test pattern on the sensor, to position the mask to avoid illuminating the pixels of the image lines at the edges 113, 114 with the test pattern and avoid interfering with the spots of the image blocking the beams illuminating the pixels of the image line near the edges 113, 114. It is preferable to sense each primary beam during multiple scan passes during one or more frames, and to average the sensed beam measurements as necessary to enable any needed adjustment to maintain the desired beam characteristics.

Figure 2:
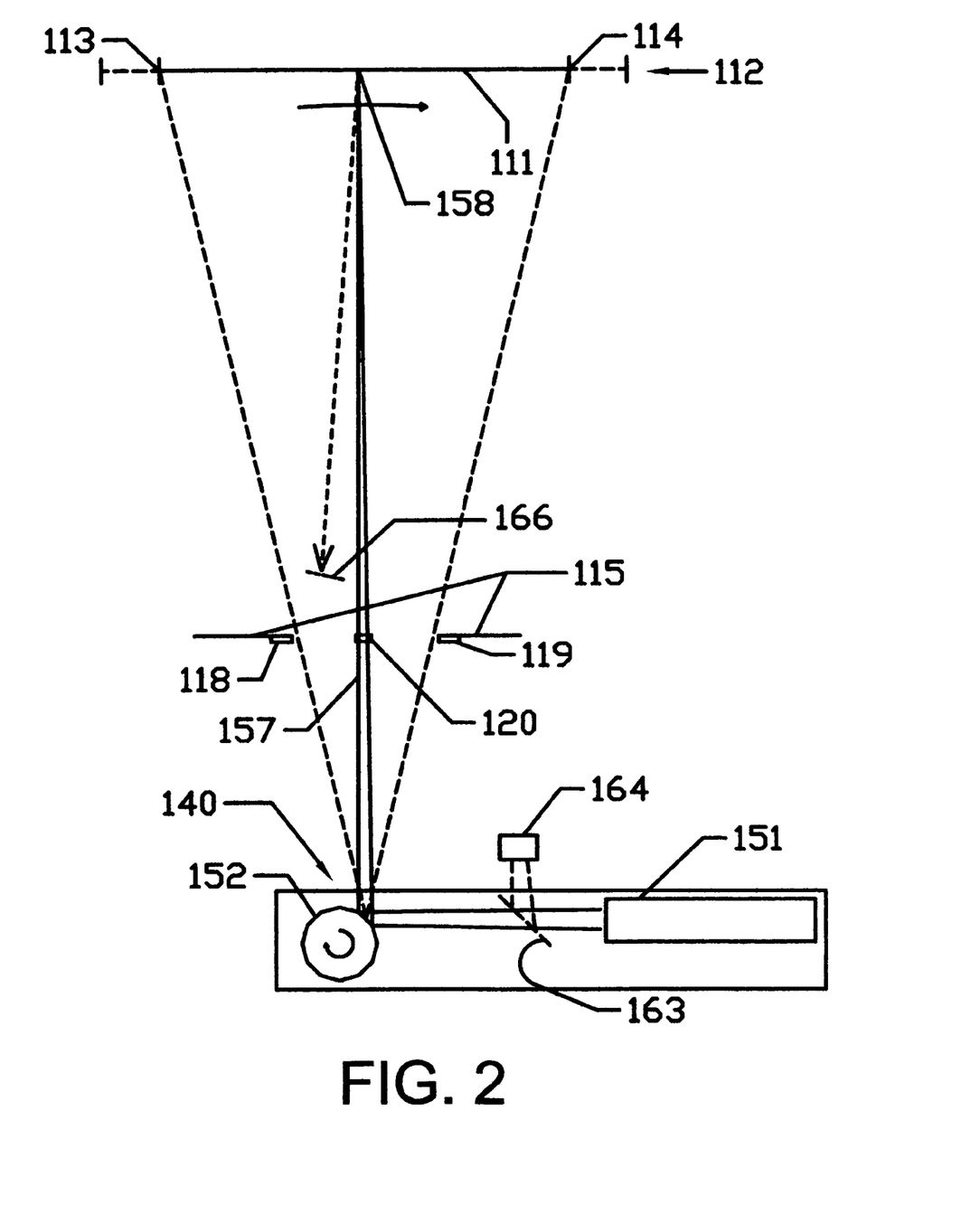
FIG. 2 is a schematic diagram showing the arrangement of components of a preferred embodiment of our invention.

Referring to FIGS. 1 and 2, it may also be preferable to utilize a centrally-placed calibration sensor 120 during set-up and/or pre-exhibition warmup to calibrate the edge sensors 118, 119 sensing beams directed toward the overscan area with respect to the same beams sweeping the central area of the image. This calibration enables the edge sensors 118, 119 to more closely relate the beam characteristics sensed in the overscan area to the beam characteristics at the center of the image frame, thereby accounting for any fall-off that might occur near the edge of a polygon facet or other difference in beam intensity or other characteristics caused by optical components used to transmit the beams from the lasers to the screen 112. Such sensor 120, when centered would block the image if used when displaying the desired images.

Figure 3:
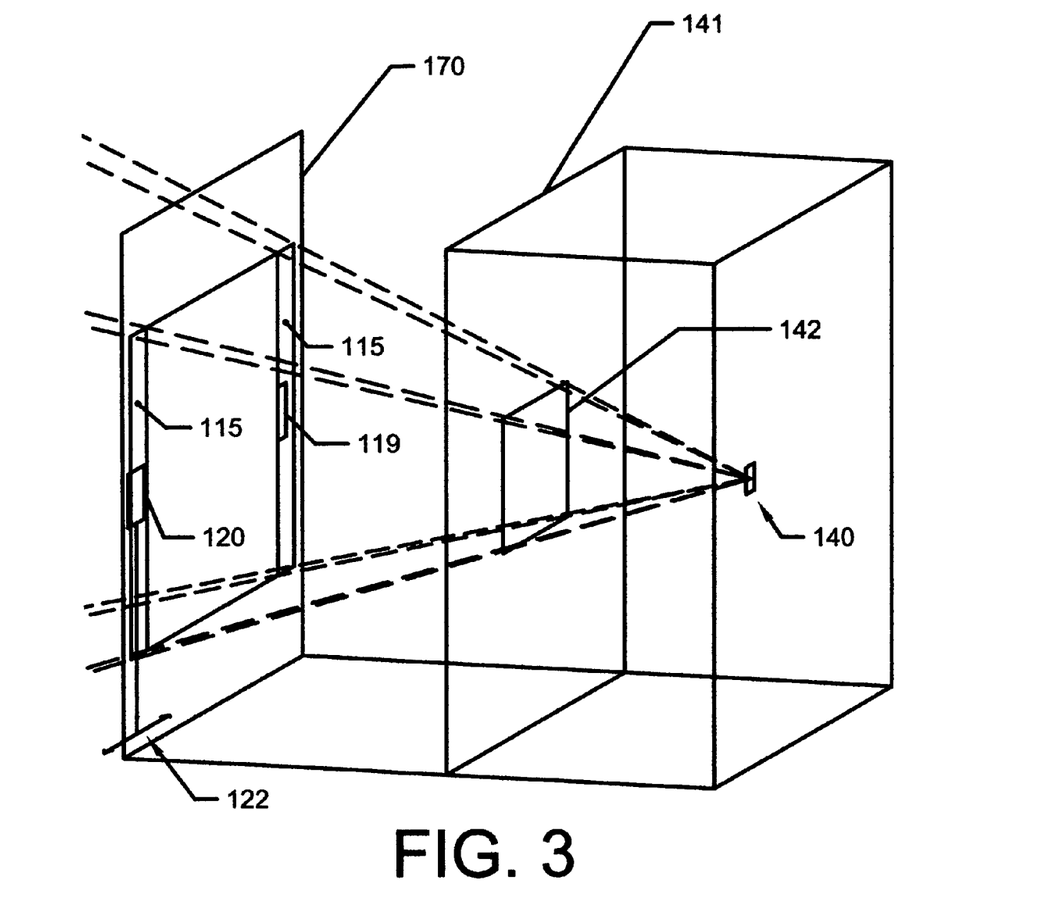
FIG. 3 is a schematic diagram showing a masking halo supporting the edge sensor elements mounted to the front of a projector housing of a preferred embodiment of our invention.

As shown in FIG. 3, in a preferred embodiment the mask is formed by halo 170 mounted to the front of the projector housing 141 of scanner 140, having an aperture 142 through which the beams are projected. Edge sensor 119 (or 118, shown in FIGS. 1, 2 and 4) is mounted on the halo 170 and thereby incorporated in mask 115 formed by the sides of the halo 170. Center calibration sensor 120 is mounted on a slide 122 attached to the halo 170, that when extended positions the calibration sensor 120 substantially near the center of the image area at substantially the same distance from the screen as the edge sensor 119, and vertically aligned with the edge sensor 119 to sense the test pattern written on the sensor 120 during the calibration step described above.

In an alternative embodiment also shown in FIGS. 2 and 4, a pickoff window 163 (or windows) is used to divert a portion of one or more of the beams before they reach the scanning element, such as after the beams exit the respective laser or the respective modulator, and direct one of more of them to pickoff detector(s) 164. Pickoff windows could be located at other points (not shown) in the laser beam path than as shown in FIG. 2 to direct the laser beam(s) to a pickoff sensor for use with our invention. This embodiment uses the same timing as used for the edge power measurement. Preferably, such a pickoff detector 164 would be calibrated to a center detector 120 in much the same manner as is preferred for the embodiment using edge sensor(s) or detector(s) 118, 119 so as to correct as much as possible for the differential effects of the downstream components upon the various beams. As with other preferred embodiments, it is preferable to utilize the blanking and masking of the beam as with the edge sensor embodiments to prevent the portion of the beam not diverted by the pickoff from being directed toward the screen 112 or another surface outside the screen during the blanking period 172.

Appropriate sensors and associated electronics are available from various suppliers and those skilled in the art will be able to select appropriate sensors, electronic circuits and control processes to practice our invention, particularly after considering the trade-offs between sensor size and signal rise time. Care should be taken in sensor selection and circuit design to accommodate the required rise times. In a current embodiment we use a sensor system based on a silicon photodiode such as FDS1010-CAL from Thor Labs. An example circuit would provide a 50 ohm photodiode load with the photo-diode current routed through an Analog Devices ADA4941-1 amplifier to be sampled at time 176 by an 18 bit Analog Devices AD7982 A/D converter. This system provides a photodiode with a sufficiently large surface area to encompass the entire beam size and a rise time sufficiently fast for the analog result of the test pattern pulse to settle at the A/D converter for highly repeatable measurements. Furthermore the photodiode noise levels are low enough to allow measurement at a range of laser intensity levels thereby enabling the development of precise laser response curves.

Some sensors, such as silicon photodiodes, suffer from polarization dependent loss (PDL). PDL may cause a false intensity reading causing the power balance and response curves to be incorrect on the screen. Orienting the sensor so it is at a zero degree incidence to the beam may reduce PDL, but since the beam is scanning across the sensor additional adaptation may be desired to ensure accurate measurements. It may be desirable to ensure that all beams being sensed have the same polarization or to scramble the polarization of polarized beams before they illuminate the sensor. In a preferred embodiment where the lasers are linearly polarized it may be desirable to deliver the beams via polarization preserving fiber and orient the polarizations of all the emitted beams at the same polarization angle. In another preferred embodiment a polarization scrambling diffuser such as an opal glass diffuser, in our current embodiment a NT46-166 opal glass diffuser from Edmund Optics, is placed between the scanning elements and the sensor to scramble the polarization and thus substantially eliminate errors due to PDL. Any active polarization scramblers, such as liquid crystal retarders or other electro optic devices, or passive de-polarizers can be used to reduce the effects of PDL.

In some preferred embodiments, the center sensor 120, as shown in FIGS. 2 and 4, is utilized during setup and calibration procedures. Specific test patterns would be used for such calibration procedures. In such use of the sensor, precision timing of the A/D sampling just when the signal is stable on the sensor is preferred. It is advisable to calibrate the center sensor 120 using external test equipment.

It may be desirable to calibrate the projector to the screen characteristics and other ambient conditions. In a preferred embodiment a sensor 166 would be positioned to sense the light dispersed from the screen. In a front projection environment the sensor 166 could be mounted on the projector body 140 or the halo 170. In another preferred embodiment, especially in the case of rear projection, the calibration sensor 166 would be placed at a position substantially representing the ideal viewing position for the viewers. In any of these embodiments a test pattern or series of patterns or images, probably encompassing the entire image area, would be projected to the screen to calibrate the projector and its color management system. Spectro-radiometers or other color sensitive sensors may be appropriate (preferred) for use as the calibration sensor 166.

While the present invention has been disclosed with reference to certain embodiments, numerous modifications, alterations, and changes to the described embodiments are possible without departing from the sphere and scope of the present invention. Accordingly, it is intended that the present invention not be limited to the described embodiments, but that it has the full scope defined by the language of the following claims, and equivalents thereof.

What is claimed is:

1. A method for projecting an image onto a viewing surface, comprising the steps of:
   traversing one or more beams during a frame pass to write one or more image lines of an image frame on a viewing surface with corresponding spots during each of a series of scan passes, each of such image lines starting and ending substantially in correspondence with desired image edges;
   during at least one scan pass traversing one or more beams substantially beyond at least one of such image edges;
   blanking such beams when they are in position to illuminate beyond the image edges; and,
   illuminating one or more such beams and its corresponding spot(s) with a test pattern when such beam(s) is directed toward a location substantially beyond the image edge.

2. The method of claim 1, further comprising the steps of:
   sensing the beam test pattern when such beam(s) is directed toward a location substantially beyond such image edge(s);
   comparing the beam characteristics demonstrated by the test pattern to desired beam characteristics; and,
   adjusting the sensed beam as necessary to achieve such desired beam characteristics.

3. The method of claim 1, further comprising the steps of:
   directing a portion of one or more of the beams to a sensor with a pickoff window in the beam path; and,
   wherein said sensing step includes sensing the test pattern when such beam(s) is directed toward a location substantially beyond such image edge(s).

4. The method of claim 1, wherein the sensing, comparing and adjusting steps occur during the writing of successive image frames during presentation of the image to observers.

5. The method of claim 4, further comprising the step of:
   preventing such test pattern from reaching the viewing surface or its environs by masking.

6. The method of claim 2, further comprising the steps of:
   sensing characteristics of at least one traversed beam directed toward a position on an image line within the image frame;
   comparing the characteristics of the beam directed toward the position within the image frame with the characteristics of the sensed beam directed toward the position outside the image frame; and
   adjusting a sensor positioned to intercept the beam positioned beyond the image edge to calibrate said sensor.

7. The method of claim 2, further comprising the steps of:
   sensing characteristics of at least one traversed beam directed toward a position on an image line within the image frame;
   comparing the characteristics of the beam directed toward the position within the image frame with the characteristics sensed by the sensor associated with the pickoff window while such beam is directed toward the location outside the image frame; and
   calibrating a sensor associated with the pickoff window.

8. The method of claim 1, wherein the at least one traversed beam is a combined beam, and wherein
   said sensing step further comprises illuminating one or more primary beams of the at least one combined beam while sensing desired characteristics of the illuminated primary(s); and
   said comparing step further comprises comparing the sensed characteristics of the illuminated primary(s) to desired primary beam characteristics, and
   adjusting the at least one directed primary beam as necessary to achieve the desired primary beam characteristics.

9. The method of claim 1, wherein the at least one traversed beam is a combined beam, and wherein
   said sensing step further comprises illuminating one primary beam of the at least one combined beam while sensing desired characteristics of the illuminated primary; and
   said comparing step further comprises comparing the sensed characteristics of the illuminated primary to desired primary beam characteristics, and
   adjusting the one traversed primary beam as necessary to achieve the desired primary beam characteristics.

10. The method of claim 1, further comprising the steps of:
    repeating the traversing and sensing steps during one or more additional frame passes;
    said comparing step further comprises comparing the sensed characteristics of the beam(s) sensed during the two or more frame passes to desired beam characteristics; and
    adjusting the sensed beam(s) as necessary to achieve such desired beam characteristics.

11. A method for projecting an image onto a viewing surface, comprising the steps of:
    traversing two or more beams along the viewing surface to write two or more image lines of an image frame during each of a series of scan passes during a frame pass;
    illuminating the viewing surface with the beams when the beams are traversed along the image lines within the image frame during the scan passes;
    blanking each beam when such beam is traversed toward positions outside the image frame at the beginning and end of each scan pass;
    illuminating at least one of the blanked beams when such blanked beam is directed toward at least one sensor located in position to intercept such blanked beam;
    sensing characteristics of the illuminated blanked beam with such sensor; and
    comparing the sensed characteristics of the beam to desired beam characteristics.

12. A system for projecting an image onto a viewing surface, comprising:
    a source of one or more beams;
    a scanner adapted to traverse the one or more beams to write one or more image lines of an image frame on the viewing surface with corresponding spots during each of a succession of scan passes during a frame pass, each of such image lines starting and ending substantially in correspondence with desired image edges;
    said scanner further adapted to traverse one or more beams substantially beyond one or more such image edges;
    said scanner including a controller adapted to blank such beams when they are in position to illuminate beyond the image edges;
    said controller further adapted to illuminate one or more such beams with a test pattern when it is directed toward a location substantially beyond the image edge;

at least one sensor associated with said scanner and positioned to intercept at least one of the beams; and said controller being further adapted to compare the sensed beam characteristics with desired beam characteristics and to adjust the beam source as necessary to conform the sensed beam to the desired beam characteristics.

13. The system of claim 12, further comprising:

a sensor located substantially in the direction of the viewing surface so as to intercept the said test pattern; and, said sensor being an edge sensor associated with said scanner and located at such position outside the image frame.

14. The system of claim 13, further comprising:

a mask to prevent the test pattern from illuminating the viewing surface or its environs which may also be incorporated into the sensor mount.

15. The system of claim 12, further comprising:

a pickoff window associated with the scanner and located in the beam path; and, said sensor being a pickoff sensor located to intercept the portion of the beam(s) diverted by the pickoff window during the writing of the test pattern substantially beyond the image edge.

16. The system of claim 15, further comprising:

a mask to prevent the test pattern from illuminating the viewing surface or its environs.

17. The system of claim 14, further comprising:

at least one calibration sensor positioned with respect to said scanner to intercept at least one of the beams when said beam is in position to illuminate a position within the image frame; and said controller being connected to receive sensed beam characteristics for a beam intercepted by said calibration sensor;

said controller adapted to compare the characteristics of said beam illuminating said calibration sensor with the characteristics of the beam illuminating said edge sensor and calibrate said edge sensor.

18. The system of claim 15, further comprising:

at least one calibration sensor positioned with respect to said scanner to intercept at least one of the beams when said beam is in position to illuminate a position within the image frame; and said controller being connected to receive sensed beam characteristics for a beam intercepted by said calibration sensor;

said controller adapted compare the characteristics of said beam impacting said calibration sensor with the characteristics of the beam illuminating said pickoff sensor and calibrate said pickoff sensor.

19. The system of claim 12, further comprising:

said beam source being adapted to provide one or more combined beams;

said controller being further adapted to control the illumination of the primaries of the combined beams; and said controller being further adapted to compare the sensed characteristics of one or more primaries with desired primary characteristics and to adjust the beam source as necessary to conform the sensed primary to the desired primary characteristics.

20. The system of claim 12, further comprising:

said scanner and controller being adapted to write multiple frame passes and to compare the sensed characteristics of the beam from two or more frame passes to desired beam characteristics, and said controller being further adapted to adjust the at least one beam source as necessary to conform the beam to the desired characteristics.

* * * * *